United States Patent
Bursey et al.

(10) Patent No.: US 10,142,441 B2
(45) Date of Patent: Nov. 27, 2018

(54) SEARCH RESULT ANNOTATIONS

(75) Inventors: Adam D. Bursey, San Jose, CA (US); Matthew E. Kulick, San Francisco, CA (US)

(73) Assignee: Google LLC, Mountain View, CA (US)

( * ) Notice: Subject to any disclaimer, the term of this patent is extended or adjusted under 35 U.S.C. 154(b) by 256 days.

(21) Appl. No.: 13/016,923

(22) Filed: Jan. 28, 2011

(65) Prior Publication Data

US 2016/0012050 A1    Jan. 14, 2016

Related U.S. Application Data

(60) Provisional application No. 61/386,159, filed on Sep. 24, 2010.

(51) Int. Cl.
*G06F 17/30* (2006.01)
*H04L 29/08* (2006.01)
*G06Q 10/10* (2012.01)
G06Q 50/00 (2012.01)

(52) U.S. Cl.
CPC ......... *H04L 67/306* (2013.01); *G06Q 10/101* (2013.01); *G06Q 50/01* (2013.01); *H04L 67/22* (2013.01)

(58) Field of Classification Search
CPC ...... G06Q 10/101; G06Q 50/01; H04L 67/22; H04L 67/306
USPC .................................................. 707/709, 722
See application file for complete search history.

(56) References Cited

U.S. PATENT DOCUMENTS

| | | | |
|---|---|---|---|
| 7,788,260 B2 | 8/2010 | Lunt et al. | |
| 7,818,392 B1 * | 10/2010 | Martino | G06Q 10/10 709/200 |
| 7,818,394 B1 | 10/2010 | Lawler et al. | |
| 8,572,129 B1 * | 10/2013 | Lee | G06Q 50/01 707/798 |
| 9,235,848 B1 * | 1/2016 | Gourley | G06Q 30/0209 |
| 9,953,342 B1 * | 4/2018 | Gourley | G06Q 30/0255 |
| 2005/0091202 A1 | 4/2005 | Thomas | |
| 2005/0256866 A1 * | 11/2005 | Lu | G06F 17/30867 |
| 2006/0004713 A1 * | 1/2006 | Korte | G06F 17/30867 |
| 2006/0294085 A1 * | 12/2006 | Rose | G06F 17/30616 |
| 2007/0011155 A1 * | 1/2007 | Sarkar | 707/5 |
| 2008/0255977 A1 | 10/2008 | Altberg et al. | |
| 2009/0077064 A1 * | 3/2009 | Daigle | 707/5 |

(Continued)

*Primary Examiner* — Mark D Featherstone
*Assistant Examiner* — Navneet Gmahl
(74) *Attorney, Agent, or Firm* — Fish & Richardson P.C.

(57) ABSTRACT

Methods, systems, and apparatus, including computer programs encoded on a computer storage medium, for annotating search results. In one aspect, a method includes receiving a search query from a user, the user having a plurality of social affinity groups, each social affinity group identifying a group of users and the user as a proper subset of users of a network. The method includes receiving search results responsive to the search query, each search result referencing a resource. The method includes identifying a search result referencing a resource having an association with one or more of the social affinity groups. The method includes annotating the search result, the annotation describing the association of one of the social affinity groups with the resource, and further identifying the social affinity group. The method includes presenting the annotated search result to the user.

17 Claims, 7 Drawing Sheets

(56) References Cited

U.S. PATENT DOCUMENTS

| | | | |
|---|---|---|---|
| 2009/0228296 A1* | 9/2009 | Ismalon | G06Q 30/02 705/319 |
| 2009/0281988 A1* | 11/2009 | Yoo | G06F 17/30867 |
| 2009/0307205 A1* | 12/2009 | Churchill et al. | 707/5 |
| 2010/0094869 A1* | 4/2010 | Ebanks | G06F 17/30867 707/732 |
| 2010/0119053 A1* | 5/2010 | Goeldi | 379/265.09 |
| 2010/0121843 A1* | 5/2010 | Goeldi | 707/722 |
| 2011/0106746 A1* | 5/2011 | Ventilla et al. | 706/50 |
| 2011/0125906 A1* | 5/2011 | Chunilal | G06F 17/30867 709/226 |
| 2011/0173176 A1* | 7/2011 | Christensen et al. | 707/709 |
| 2011/0196863 A1* | 8/2011 | Marcucci et al. | 707/728 |
| 2012/0001919 A1* | 1/2012 | Lumer | 345/440 |
| 2012/0158720 A1* | 6/2012 | Luan et al. | 707/732 |
| 2012/0296974 A1* | 11/2012 | Tabe | 709/204 |
| 2013/0282706 A1* | 10/2013 | Yoo | G06F 17/30867 707/723 |

\* cited by examiner

SEARCH RESULT ANNOTATIONS

CROSS-REFERENCE TO RELATED APPLICATIONS

This application claims the benefit of U.S. Provisional Application No. 61/386,159, filed Sep. 24, 2010. The above-referenced application is incorporated herein by reference.

BACKGROUND

This specification relates to annotating search results of social interest to a user.

Many users throughout the world access the Internet and communicate with each other either directly or indirectly by use of the Internet. Any particular user using the Internet may have many different relationships with many other users, and these relationships may be explicit or implicit. For example, social network sites are web sites that enable users to establish and track explicit relationships between the user and other users of the social network site; users within a same geographic region, or that have taken similar actions with respect to Internet resources, may be connected by an implicit relationship.

Search engines identify resources stored in an index which are responsive to queries. A social search engine can identify resources that are associated with members by one or more relationships.

SUMMARY

This specification describes technologies relating to annotating search results of social interest to a user.

In general, one innovative aspect of the subject matter described in this specification can be embodied in methods that include the actions of receiving a search query from a user, the user having a plurality of social affinity groups, each social affinity group identifying a group of users and the user as a proper subset of users of a network. The methods can also include receiving search results responsive to the search query, each search result referencing a corresponding resource that is determined to be responsive to the search query. The methods can also include identifying a search result referencing a resource having an association with one or more of the social affinity groups. The methods can also include annotating the identified search result, the annotation describing the association of one of the social affinity groups with the resource the identified search result references, and further identifying the social affinity group. The methods can also include presenting the annotated search result to the user.

In general, another innovative aspect of the subject matter described in this specification can be embodied in methods that include the actions of receiving a search query from a user, the user having a plurality of social affinity groups, each social affinity group identifying a group of users and the user as a proper subset of users of a network. The method also includes receiving search results responsive to the search query, each search result referencing a corresponding resource that is determined to be responsive to the search query. The method also includes identifying a search result referencing a resource having an association with a plurality of users in the social affinity groups. The method also includes determining if a count of the plurality of users having the association is greater than a threshold associated with an annotation term. The method also includes determining to apply the annotation term to the search result based, in part, on the count.

These and other embodiments may optionally include one or more of the following features. The associations may be defined by actions that include one or more of: a member creating the resource, a member sharing the resource with another member, and a member endorsing the resource. The social affinity groups may include a list of members identified by the user in a social networking service, a member and the user belong to a group, a member and the user share a geographical area, and a member and the user each have a relationship with a second user. Annotating the identified search result may include selecting the association from a plurality of associations according to a pre-determined hierarchy. Annotating the identified search result may include determining a count of members of the social affinity group having a same association with the identified search result and annotating the identified search result based on the count. The method may also include determining not to annotate a second search result having an association with a second member of the social affinity group in response to a number of previously annotated search results not exceeding a threshold. The methods may also include identifying a second search result associated with previous search activity of the user. The methods may also include annotating the second search result based on the association with the previous search activity. Annotated search result may include a hyperlink to a user profile of a member of the social affinity group. Determining a count of the plurality of users may include determining a count of the plurality of users in a social affinity group. Determining to apply the annotation term may include determining the count exceeds the threshold. Determining to apply the annotation term may include determining the count does not exceed the first threshold, determining the annotation term had been previously applied to search results referencing the resource, and determining the count is greater than a second threshold. The threshold may depend on a count of the users in the social affinity group. The annotated search result may include a hyperlink to member generated content associated with the resource.

Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. Users can be information about the reason a search result was determined to be of social interest. Search results on social interest can be presented to the user together with general search results.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
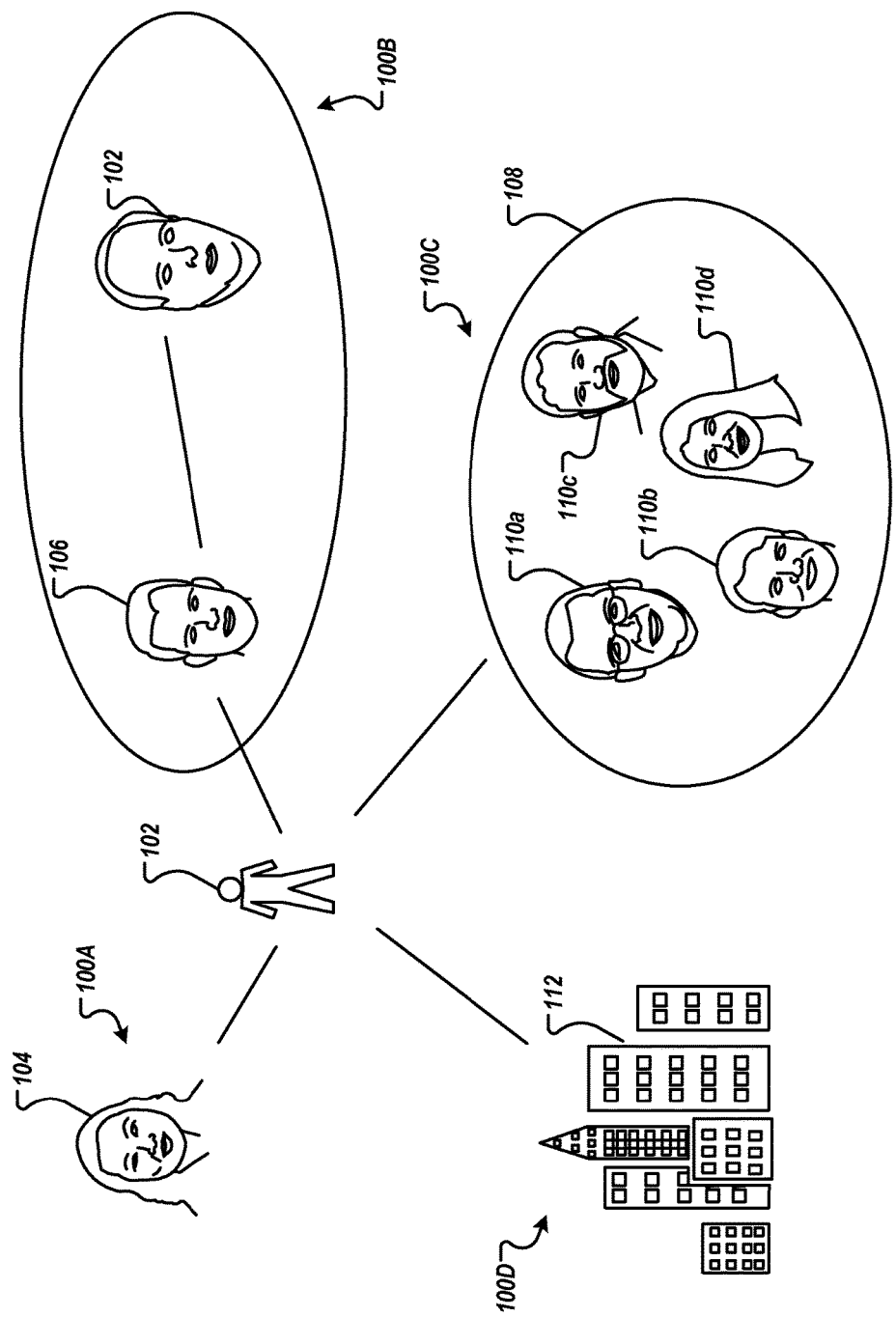
FIG. 1 illustrates an example social affinity group of a user.

A user searching for resources has social interests separate from the interests of a general population of users. For example, the user can have social interest in resources associated with people related to the user. A picture of people at a social gathering is likely more interesting to a user if the picture is of the user's friends than it is to users who have no relationship with the people pictured. Likewise, a picture of an event in a particular city is likely more interesting to a user form that city than it is to users from distant cities.

As describe above, any particular user using the Internet may have many different relationships with many other users that also use the Internet, and each of these relationships can define a social affinity group of the user. As used in this specification, a "social affinity group" of a user is a group of other users with whom the user has a relationship known by a search system and which are regarded as an independent whole separate from other social affinity groups. Users can be connected to one another in a social graph. The relationships between users can be of a predefined type and can be implicit or explicit. Explicit relationships are identified by the user, e.g., friends, family, business, or other connections established by the user. Implicit relationships can be identified by the search system with permission of the user. Whether implicit or explicit, the relationship of the social affinity group identifies the group of users and the user as a proper subset of users of a network. Examples of groups identified by explicit relationships include users belonging to a "friends lists" of a user in a social network, users that are "linked to" a user in a professional network, and users that otherwise explicitly identify themselves as belonging to a group so as to form a group that is distinct from the larger group of all users. Examples of groups identified by implicit relationships include users located near a common location (e.g., users within a predefined distance of a city center), users that have opined on a particular product or article (e.g., users that have provided a review for a particular product) and users that are otherwise implicitly identified so as to form a group that is distinct from the larger group of all users.

In response to a query received from a client device of a user, a search engine identifies resources that may be of particular social interest to the user. The search engine generates search results of indicating the social interest to the user, and provides the search results to a client device of the user. For example, a "friend" of the user, as defined by a relationship in a social network, may have tagged a resource as interesting. The search engine, aware of a relationship or connection between the user and the friend, generates a search result that indicates the friend tagged in the resource.

The search engine is configured to annotate search results that are indicative of a social interest to the user and the social affinity group to which the social interest corresponds.

In some implementations, a ranking process is used to rank multiple annotations that apply to a search result, and the top ranked annotation is selected for annotating the search result.

Each annotation describes an association of one of the social affinity groups with the resource the search result references, and further identifying the social affinity group. The annotation can further describe an action taken by a member of the social affinity group, or an action or result associated with the social affinity group. For example, an annotation may be of the form:

{Action description}
{Member of Social affinity group or Social affinity group}
{Additional details}

In some implementations, thresholds are used to avoid search result annotation clutter and to cull low-quality (e.g., "noisy") annotations. Example thresholds include minimum numbers of members of a social affinity group taking a common action, a minimum size of a social group, etc.

In some implementations, obfuscation algorithms are used to preclude identification of members of a social affinity group when annotations for the social affinity group are presented. For example, an obfuscation algorithm prevents a user from determining an identification of another user and an action taken by the other user by manipulating a friends list and repeating a search.

The annotations, thresholds and obfuscations are described in more detail below.

FIG. 1 illustrates example social affinity groups of a user 102. The social affinity group 100A of the user 102 includes a first friend 104 identified by the user 102. The user 102 can identify the first friend 104 in, for example, a user profile. A user profile can include, for example, a list of the members of the user's social affinity group. The profile may be, for example, a user's profile for a blog, or a profile for a social network. For the former, the social affinity group may include followers of the user's blog.

In the case of the latter, the user profile can include information that identifies social network services in which the user participates. Generally, a social network service enables users to establish social relationships with other users of the social network service. The social affinity group 100B of the user 102 also includes a second friend 106 related to the user 102 on a social network service. In some implementation, the user 102 identifies himself as a member of a social network service. The social network service can be examined, for example, with permission from the user 102, to identify the user's friends on the social network service (e.g. the second friend 106).

The user 102 is related to a group 108 of co-workers 110a, 110b, 110c, 110d based on place of employment. This relationship establishes another social affinity group 100C. In some implementations, the user 102 identifies himself as an employee of a company; with permission of the user, the user can then be identified with a group of others employed by the same company (who grant similar permission), e.g., by use of an LDAP database. In other implementations, the user 102 can identify the co-workers 110a, 110b, 110c, and 110d as being members of the group 108 in the user profile. Other groups can also be identified, for example, class mates, fraternity/sorority members, club memberships, professional organizations, social clubs, fan clubs, etc.

The user 102 is also related to others in the same city, town, or geographical area 112, and this relationship establishes another social affinity group 100D. In some implementations, the city, town, or geographical area 112 can be identified based on IP address. In other implementations, the city, town, or geographical area 112 is identified in the user profile.

The social affinity groups 100 of the user 102 can also include other users indirectly related to the user 102. For example, the social affinity group 100B of the user 102 can, in so an individual 114 who is indirectly related to the user 102 through the second friend 106 of the user.

The social affinity groups 100 can also include others who have other relationships with the user 102. For example, in some implementations, a social affinity group of the user can include the contributors to blogs or micro-blogs to which the user subscribes. In some implementations, a social affinity group of the user can include others with whom the user has had email correspondence, others identified in the users address book, and others in an instant messaging contact list. Other social affinity groups can be established by common attributes (e.g., subscribers to a service, users that have similar content/topical preferences, etc.). In some implementations, a social affinity group of the user can include others who share common key words in their profile (for example, they both list the same favorite band.).

In some implementations, social affinity groups change over time. A user may move to another city, change the keywords in their profile, or change who is listed as a friend in their profile. For example, a user may change the name of their favorite band in their profile, and consequently change implicit members of their social affinity group. In some implementations, the social affinity group for a user may be continually updated. In other implementations, the social affinity group for a user may be updated periodically (e.g. every ten minutes, even half hour, every hour, or once a day).

Figure 2:
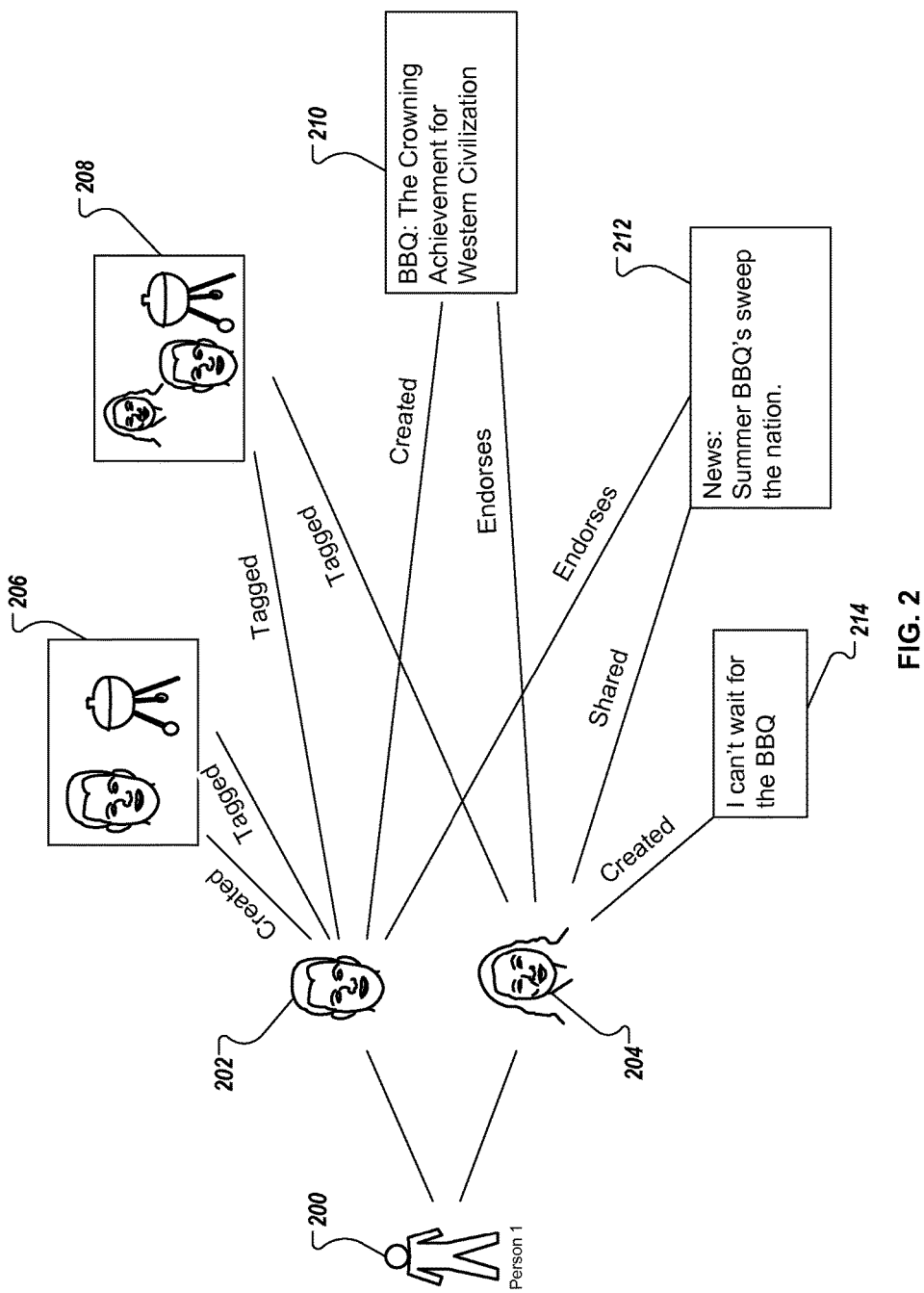
FIG. 2 illustrates example associations between resources and members of a social affinity group of a user.

FIG. 2 illustrates example associations between resources and members of social affinity groups of a user. A resource can, but need not, correspond to a file. A resource can be stored in a portion of a file that holds other resources, in a single file dedicated to the resource in question, or in multiple coordinated files.

A member of the user's social affinity group can be associated with a resource through the creation of the resource. As used in this specification, the term "member" refers to a member of the user's social affinity group. For example, a first member 202 created an image 206 and a blog entry 210. A second member 204 created a micro-blog entry 214.

A member can be associated with a resource through an action which indicates approval of a resource. The member can share the resource with others (e.g. by sending a reference to the resource to others) or the member can indicate they like the resource (e.g. by clicking an icon or button on a website that hosts the resource). For example, the first member 202 has indicated that he likes a news item 212. The second member 204 shared the news item 212 and indicated that she likes the blog entry 210. In some implementations, a member may have rated the resource using a ranking (e.g. given a 4 out of 5 stars). In some implementations, the member approval of the resource can be indicated in member generated content, for example, a blog entry, a micro-blog entry, or a comment.

A member can also be associated with a resource because someone has indicated that the member is a subject of the resource. For example, the first member 202 is tagged in the image 206 and a second image 208. The second member 204 is tagged in the second image 208. Multiple other associations of members and resources are possible, and a resource can be associated with more than one member. For example, the first member 202 and the second member 204 are both tagged in the second image 208; the first member 202 created the blog entry 210 and the second member 204 indicated that she liked the blog entry 210; the first member 202 indicated that he liked the news item 212 and the second member 204 shared the news item with others.

Some associations between a member and a resource can be private. For example, the first member 202 may have liked the news item 212 privately. That is, the first member 202 can have expressed a desire that his approval of the news item not be available to the public, e.g., by selecting a "private bookmark" option when linking to the resource.

Figure 3A:
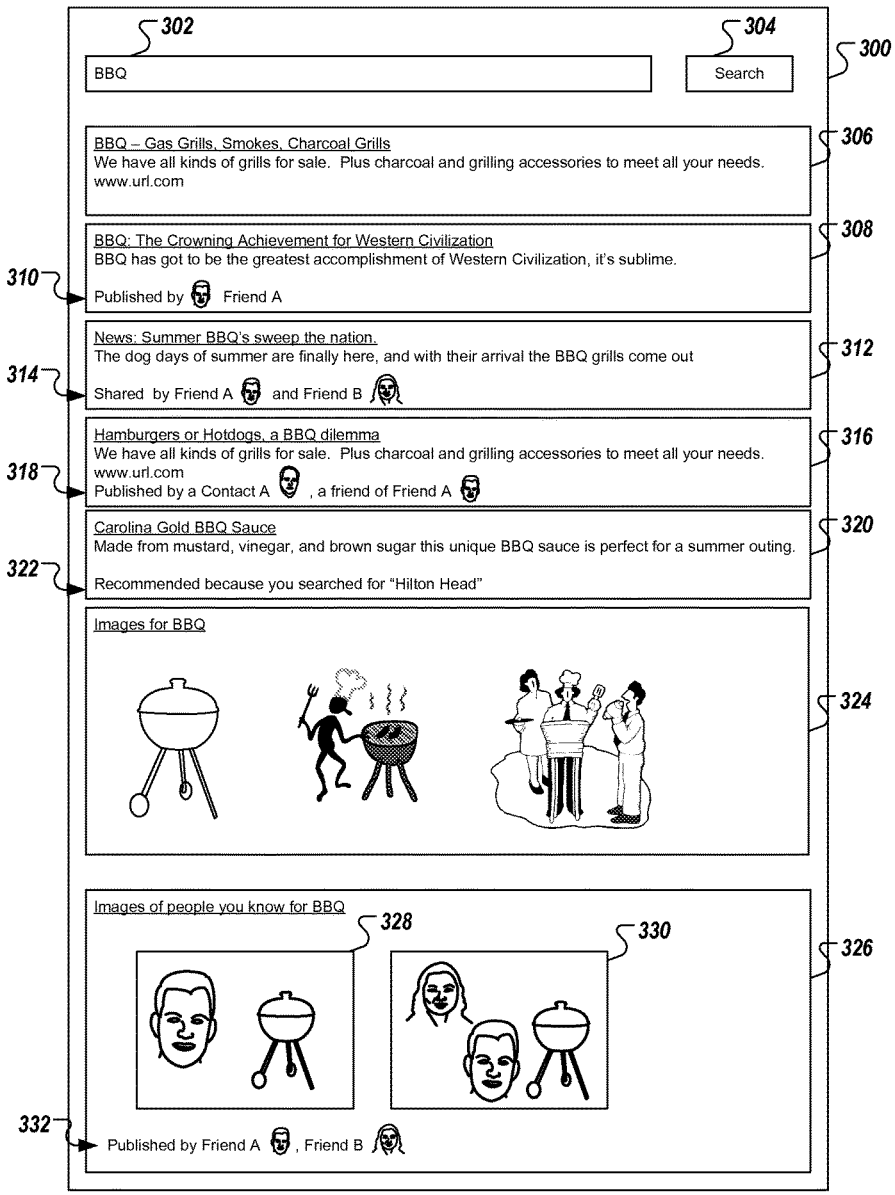
FIG. 3A illustrates an example search page with search results.

FIG. 3A illustrates an example search page with search results. On the search page 300, a user (not shown) enters a search query into a search query field 302 and selects (clicks) a search button. A search engine capable of identifying the social affinity group of the user and annotating results based on the social affinity group returns a set of search results responsive to the query. Some search results, for example search result 306, are search results that reference resources that are not associated with a member of the user's social affinity group, and thus are not annotated.

Other search results with annotations appear in the search results, at least in part, because the references the search results reference are associated with the members of the user's social affinity group. For brevity, a search result is described as being associated with a member of a user's social circle if the underlying resource the search result references is associated with a member of the user's social circle.

To help the user discern search results of social interest, search results are annotated to explain the reason the search result was presented to the user. For example, the search result 308 includes an annotation 310 which explains that the resource corresponding to the search result was published (or created) by "Friend A". In some implementations, the relationship between the user and the member of the user's social affinity group is included in the annotation. For example, hovering over the name "Friend A" can produce a display stating "connected to Friend A on social networking site". In another example, the relationship between the user and the member can be described in the annotation. For example, the annotation may recite "Published by Friend A, connected to Friend A on social networking site." In other example, known relationships between the user and the member can be enumerated in the annotation. For example, the annotation may recite "Published by Friend A, connected to Friend A on first social networking site, connected to Friend A on second social networking site" or the annotation may recite "connected to Friend A on first social networking site and second social networking site."

In some implementations, selecting (clicking) on the name of the member of the user's social affinity group links to the user profile page of that member.

In some implementations, an annotation can identify that multiple members of the user's social affinity group are associated with the resource corresponding to the search result. For example, search result 312 includes an annotation 314 which identifies that the resource corresponding to the search result was shared by "Friend A" and "Friend B". In some implementations, the annotation can include an indicator that the resource corresponding to the search result was shared privately (e.g. a "lock" icon).

In some implementations, an annotation can identify a resource related to the annotation. For example, an annotation that a search result was "endorsed by Friend A" can include a link to the endorsement (for example, a blog post where Friend A endorses the search result).

In scenarios where the member associated with the resource is in the extended social affinity group of the user, the search result can include an annotation which explains the relationship between the member and the user. For example, search result 316 includes an annotation 318 which identifies that the resource was published by "Contact A" who is identified as a friend in the social affinity group of "Friend A." The relationship can be described with respect to the member of the user's social affinity group who is closest to the member. For example, "Contact A" can be described relation to "Friend A" because "Friend A" is in the user's social affinity group. In one example, the relationship between the member and the user can be explained in hover text that appears when a mouse or other pointing device is placed over the member's picture, the member' name, or anywhere on the annotation.

In some implementations, a search result is of social interest based on previous searches performed by the user and previous resources accessed by the user. For example, if a user performs searches on "South Carolina" and selected a result for "Hilton Head" and later searched for 'BBQ" the search result can provide a listing related to Carolina barbeque because the user an indicated interest in that region of the country. For example, a search result 320 includes an annotation 322 indicating that the search result was presented because the user had previously searched for "Hilton Head."

The search page 300 can also include image search results. Image search results can be separated into images of general interest presented in one area 324 of the search page 300 and images of social interest 326 presented in a separate area of the search page 300. Images of social interest can be annotated collectively or individually. For example, the images 328, 330 are collectively annotated with an annotation 332 indicating that the images were published by "Friend A" and "Friend B." Other annotations are also possible.

As describe above, an annotation provides information about why search results were determined to be of social interest to the user, and actions taken by member of the social affinity group to which the annotation corresponds. For example, search results related to members of a user's social affinity group can contain information about how the search result is associated with a member of the social affinity group and how that member is related to the user. Annotations of search results related to prior user activity can contain information about which prior searches or result selections caused the search result to be deemed of social interest. For example, a search result can be recommended because the user had previously selected a search result referencing a particular resource, or because the user had visited that resource.

In some implementations, information about where the resource is located can be provided in the annotation. For example, a search result can include the annotation "published by Friend B on Micro-Blog site." Information in the annotation can also include a temporal aspect (e.g. shared recently by Friend A and Friend B, shared last week by Friend A, etc.).

In some implementations, annotations can permit the user to perform some action relative to the resource referenced by the search result. For example, the annotation may include a link such that when the user selected (clicks) the link the user endorses the resource. Other operations that can be supported include posting a micro-blog entry about In some implementations, information can be aggregated in the annotations. The aggregated information can include a count of members having the same association with the resource. For example, a search result can include the annotation aggregating public information such as "approved by 143 people in Chicago." A search result can also include annotations aggregating private information such as "approved by 8 of your co-workers'. Public and private information can be collected in response to a user granting permission to the system. In some implementations, annotations can aggregate information from others without regard to the user's social affinity circle (e.g. "approved by 4,000 people").

In some implementations, information about the association between a member and a resource can be private. For example, a member of the user's social affinity group can anonymously share a news item or anonymously give a positive review to a blog post. The information in the annotation can include relative terms to protect the privacy of these associations. For example, an annotation can state "approved by many of your co-workers" in the place of "approved by 12 of your co-workers."

The inclusion of the relative terms such as "many" and "some" is, in some implementations, based on a thresholding algorithm. The threshold algorithm ensures that the privacy of individual users of a social affinity group is protected. For example, for a descriptive term e.g., "some", "many," etc., the term is applied according to the threshold formula:

$$k = k_0 + f(E, \text{members}(c), k_0, 0)$$

Where E is the resource, c is the social affinity group of the user, k is the threshold value to the use of the particular term, $k_0$ is target threshold value for the term; $f$ is a crypto-strong hash function; and members(c) is a crypto strong hash function modulo a of the members of the circle c. For example, for the term "some", k may be some value n; for the term many, k may be m, where m>n.

Figure 3B:
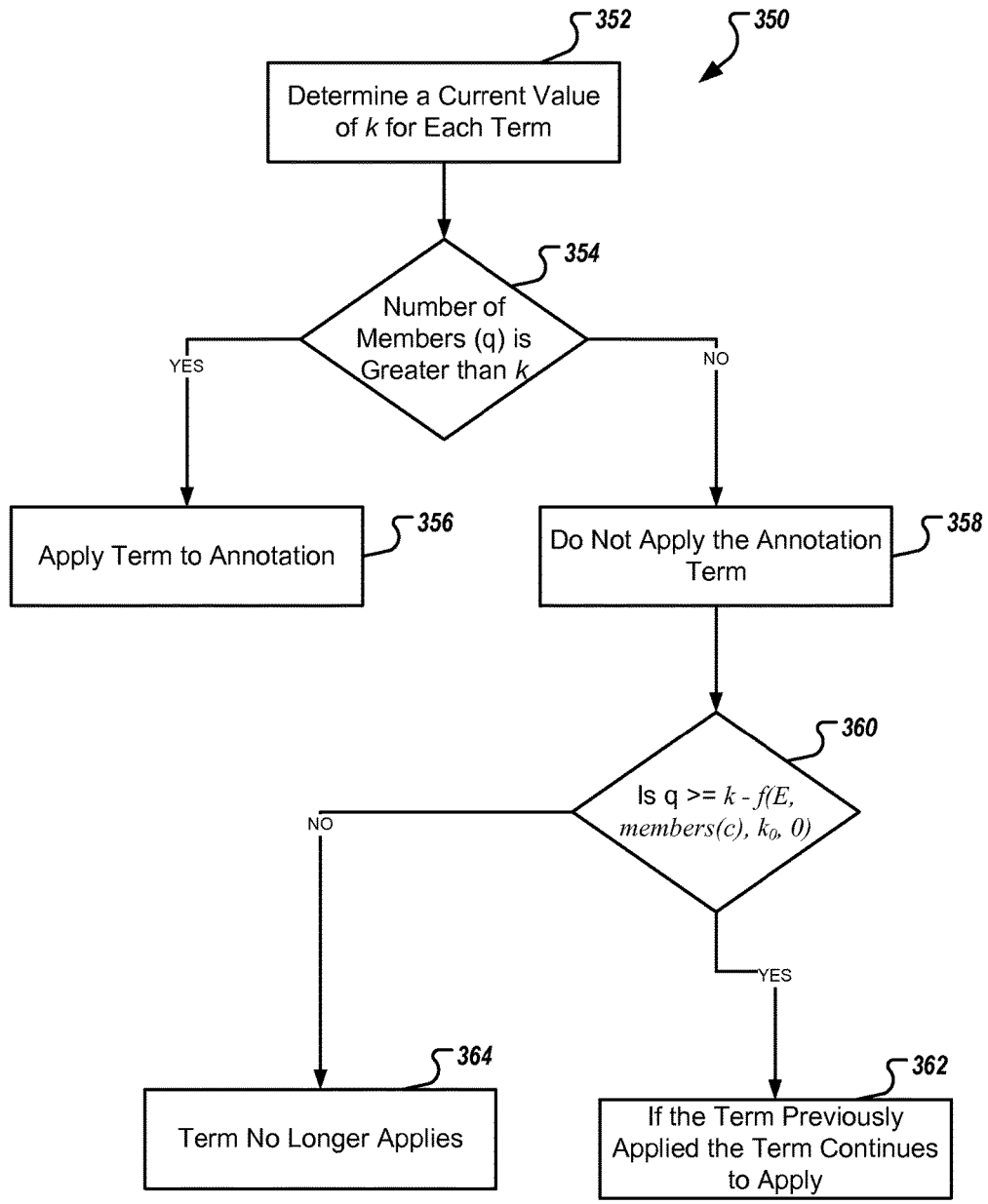
FIG. 3B is a flow diagram of an example process for determining thresholds.

FIG. 3B is a flow diagram of an example process for determining thresholds. The process 350 determines a current value of k for each term (352). For example, if the term has been previously presented in an annotation, its value of k is read from storage. Otherwise, the term k is computed by $k = k_0 + f(E, \text{members}(c), k_0, 0)$.

The process determines if the number of members q of the social affinity group to which a search result is associated is greater than k (354). If the process determines that k>q, then the term is applied to the annotation (356). If more than one term applies, i.e., the values of k for "some" and "many" are both exceeded by q, i.e., q>m>n (where m threshold for many, and n is the threshold for some) then, in some implementations, the term for which the largest value of k is exceeded is applied (in this case m). Thus, once a threshold is determined, the number of members of the user's social affinity group with the association to the resource is compared to the threshold. If the number of members exceeds the threshold then the term can be applied to the annotation. If the number of members of the user's social affinity group who had the same association with the resource is greater than the threshold value (k) then the term applies to the search result and can be used in the annotation.

Conversely, if the process 350 determines that k<n, then the term is not applied to the annotation (358), and the value of k as determined by the formula above, is written to storage as a new threshold.

The process 350 determines, for a term that previously applied to a search result, if the value of q is greater than or equal to $k - f(E, \text{members}(c), k_0, 0)$ (360). If so, the term continues to apply (362) and the process ends.

If the process 350 determines that q is less than $k-f(E, members(c), k_0, 0)$, then the term no longer applies, and the value of $k=k_0+f(E, members(c), k_0, 0)$ is written to memory (364). Accordingly, a historical record of terms applied to annotations of search results referencing the resource is maintained. When a term (e.g. "some" or "many") is applied to an annotation for a search result referencing a resource, a record of the application of the term to the resource is recorded. Once a term is applied to the resource, the term continues to apply to search results referencing the resource unless the number of members in the user's social affinity group with the association to the resource falls below a lower bound, e.g., $k-f(E, members(c), k_0, 0)$.

In some implementations, the target threshold for a term may vary based on the size of the user's social affinity group. For example, the threshold number of members having the same association with a resource to apply the term "many" to an annotation may be the greater of 5, 10, 15, or 20 and the number of members in the user's social affinity group divided by 3, 5, or 7 (e.g. $\max(15,|c|/7)$). In some implementations the threshold to apply the term "some" to an annotation may be the greater of 3, 5, 10, 15 and the number of members in the user's social affinity group divided by 5, 7, or 10 (e.g. $\max(10,|c|/10)$).

A similar thresholding can be used to annotate search results based on the relative popularity of the resource in the user's social affinity group compared to other resources. For example, an annotation of a popular search result may state "one of the most approved pages among co-workers."

Figure 3C:
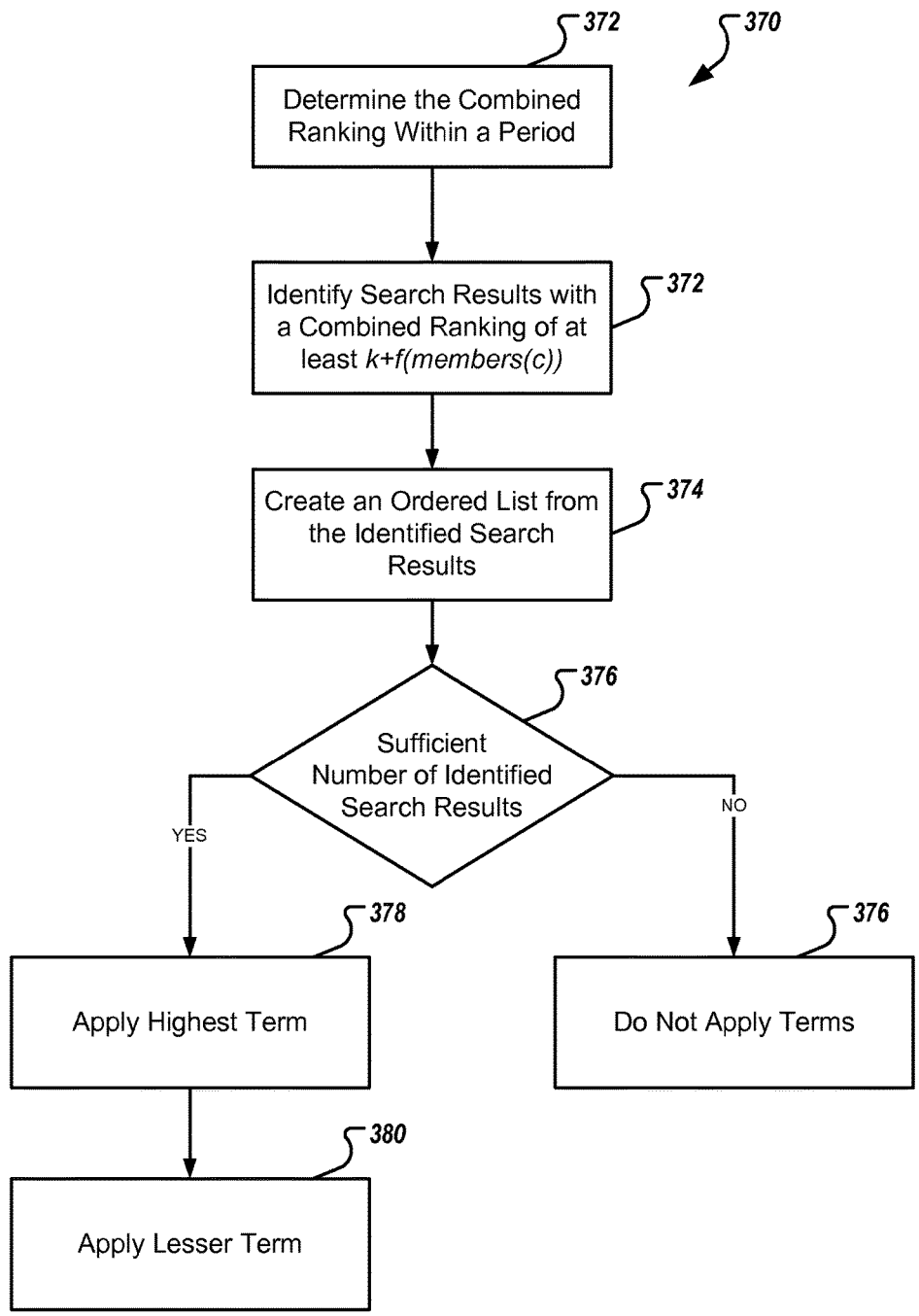
FIG. 3C is a flow diagram of an example process for determining histograms.

FIG. 3C is a flow diagram of an example process for determining histograms. In some implementations, the most popular resources for members of a user's social affinity group are determined based on histogram algorithms using the rankings given to the resource by the members (e.g., 4 out of 5 stars). The process 370 determines the combined ranking from members of the social affinity group within a given period (372). The combined ranking can be, for example, the total number of votes a resource associated with the search results has received, or the sum of the numeric rankings the resource has received from members of the user's social affinity group. The period is a period of interest (e.g. the past 24 hours, the past 30 days, over all time).

The process 370 identifies search results with a combined ranking of at least $k+f(members(c))$ (372), where k is a baseline threshold (for example, 4, 5, or 6), c is the user's social affinity group, and members(c) is the number of members in the user's social affinity group, and $f$ is a crypto-strong hash function modulo b.

The process 370 creates an ordered list from the identified search results (374). All resources given a ranking of at least k by the members of the user's social affinity group are compiled into a list ordered by ranking.

The process 370 determines if there are a sufficient number of identified search results (376). In some implementations, the process 370 determines if there are at least 5 identified search results. If not, the process 370 does not apply terms (376).

If so, the process 370 applies the highest term (378) to some of the identified search results. In some implementations, the process 370 applies the highest term (e.g. "top", "most popular") to the maximum of either 3 identified search results or the number of identified search results divided by 10. (e.g. for 20 identified search results the process would apply the highest term to 3 identified results, 3>20/(10=2)). The process 370 can optionally apply a lesser term (380) to some identified search results. In some implementations, the process 370 applies the lesser term (e.g. "popular") to half of the identified search results (e.g. the number of identified search results divided by 2). For example, for twenty identified search results, the highest term may apply to the first three and the lesser term may apply to the next ten (number 4-13)).

Search results can be annotated based on the significance of the information that forms the basis for the determination of social interest. Generally, information related to a user's social affinity group is considered more significant than information about prior user activity. If a search result is of social interest based on prior searches and a relationship through the user's social network, the social network information will be prioritized. For example, a user has previously searched for "Hilton Head" and subsequently searches for "BBQ." The search result "My Favorite South Carolina BBQ" published by "Friend A" is of social interest to the user because of the prior search (Hilton Head) and because the result was published by a friend (Friend A). In this example, the information about the friend will be included in the annotation, and the information about the prior search will not.

Information regarding the association between a resource and a member of the user's social affinity group can be prioritized based on a measure of the significance of the association and a measure of the significance of the relationship between the member and the user. In some implementations, relationships that include a member of the user's immediate social affinity group (e.g. a friends list) are prioritized over relationships that include members of groups in the user's social affinity group (e.g. co-workers). Relationships that include members of groups in the user's social affinity group are prioritized over relationships that include a geo-aggregation of members in the same geographic area as the user (e.g. people in San Francisco).

Within each of these relationships (e.g. friends, groups, and geo aggregates), associations related to the creation or publication of resources is prioritized (e.g. created by Friend A). Information about resources shared with the user directly or indirectly by a member of the user's social affinity group is prioritized second (e.g. shared by Friend A, resources shared by Contact A through Friend A, etc.). Information about resources liked by members of the user's social affinity group is prioritized third (e.g. liked by Friend A).

For recommendations based on prior user activity, information based on prior searches (e.g. a search for "Hilton Head") is prioritized over information about sites visited by the user (a visit to N-C-BBQ.com).

In some implementations, information for users having different relationships to the user and the same association with the resource can be combined in the annotation. For example, a search result can include the annotation "liked by Friend A, Friend B, and some Co-Workers".

In some implementations, no more than a maximum number of search results are annotated. For example, only the first four search results of social interest to the user may be annotated. In some implementations, the remaining search results, even if determined to be of social interest to the user, are not annotated. The determination whether to annotate a particular search result can depend on a threshold number of previously annotated search results (e.g. if four search results have already been annotated then the fifth search result may not be annotated). In other implementations, remaining search results of social interest to the user are removed from the search results list.

In some implementations, all possible annotations for all search results are determined prior to determining which, if any, search results to annotate. In some implementations annotations for all top search results are determined prior to determining which, if any, search results to annotate. Top search results may be, for example, the top 10, 20, or 30 search results. In some implementations, the top search results are the search results that appear on the first page of search results in a user interface.

In some implementations, which search results to annotate depends on the historic selection rates of search results having the annotations. For example, if search results annotated with a first annotation (e.g. "shared by Friend A") are selected more frequently than annotations with a second annotation (e.g. "created by Friend A") then the first annotations will be preferred. In some implementations, which annotations are preferred depends on the kind of association between the resource and a member of the user's social affinity group. For example, if resources created by a member are selected more frequently than resources shared by a member, then search results referencing resources created by a member will be annotated before search results referencing resources shared by a member. In some implementations, determining which annotations are preferred depends on the member of the social affinity group associated to the resource referenced by the search result and also the kind of association between the member and the resource. For example, annotations may be preferred based on historic selection rates (e.g. if search results annotated "created by Friend A" are selected more frequently than search results annotated "shared by Friend B" which is selected more frequently than search results annotated "created by Friend C" then search results referencing resources created by Friend A will be annotated before resources shared by Friend B. Resource shared by Friend B will be annotated before resources created by Friend C.

Figure 4:
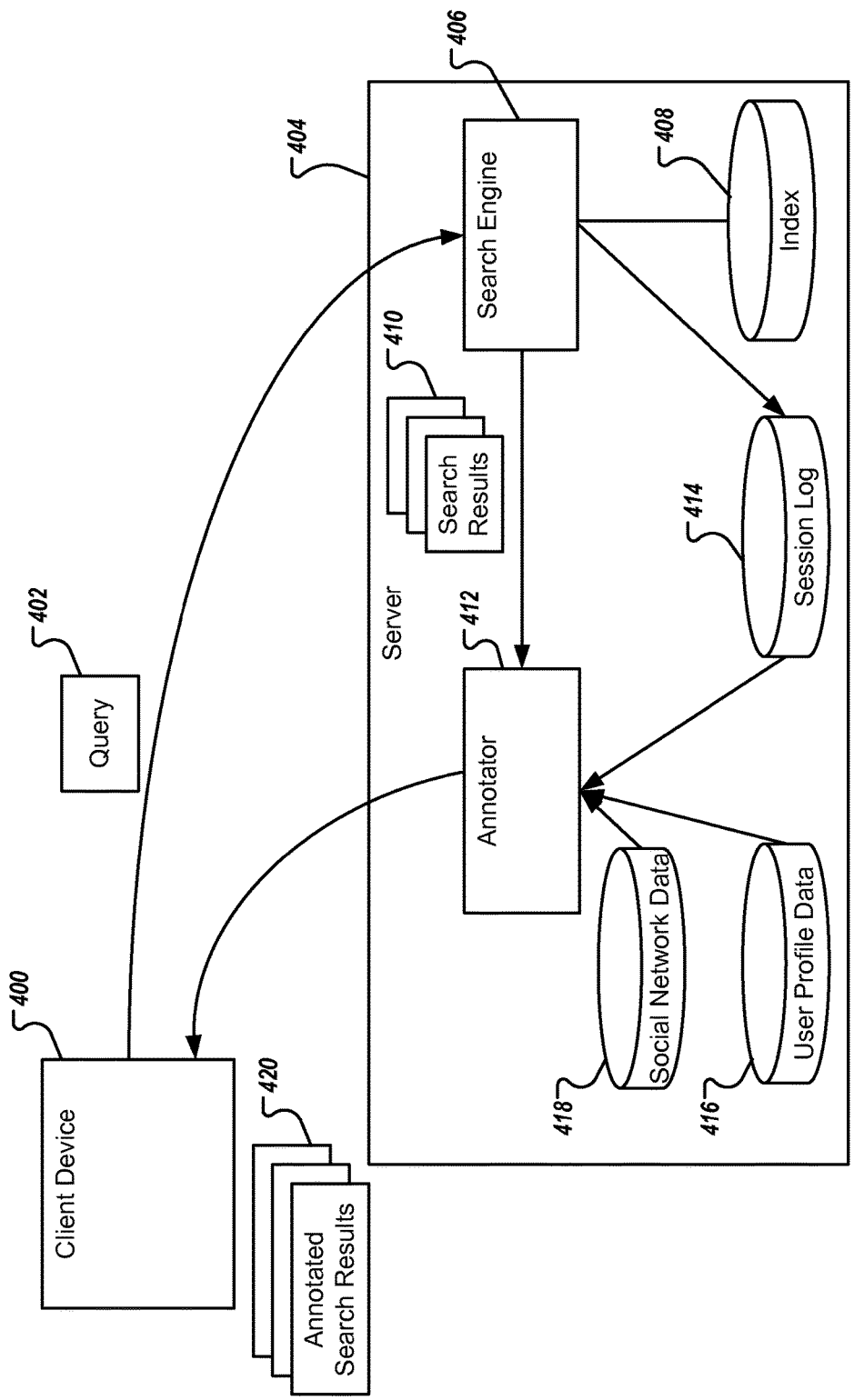
FIG. 4 illustrates an example system for annotating search results.

FIG. 4 illustrates an example system for annotating search results. A client device 400 sends a query 402 to a server 404 including a social search engine 406. For example, the client device 400 can send the query 402 to the server 404 over a network, such as the Internet, a wide area network, or a local area network.

The search engine 406 is capable of performing searches of documents. The search engine produces search results 410 responsive to the query from resources that have been stored in an index 408. In some implementations, the search engine 406 stores the query 402 in a session log 414. The session log 414 can also include previous search activity of the user and other users. Generally, the previous search activity can include information identifying prior queries of the user as well as search results selected by the user.

The search results from the search engine are received by an annotator 412. Some of the search results 410 refer to resources associated with members of the user's social affinity group. In some implementations, the annotator 412 identifies the members and the association between the resources and the members are identified by the search result and annotates the search results as appropriate. For example, a search result can include one or more tags or attributes which identify how the search result is related to a member of the user's social affinity group. The search result can include a tag which states the corresponding resource was "created by friend A." In another implementation, the annotator, examines the search results and identifies the associations between the members of the user's social affinity group and the resource using the session log 414, user profile data 416, and social network data 418.

The annotator 412 annotates the search results 410. In some implementations, the search results 140 are annotated based on a pre-determined hierarchy of relationships between members of the user's social affinity group and a pre-determined hierarchy of associations between the members and the search result, as described above. In other implementations, the search results 140 are annotated based on a hierarchy calculated based on prior user activity stored in the session log 414. For example, a hierarchy of associations between members of the user's social affinity group and the search result can be based on comparative selection rates of annotated search results. If search results including annotations indicating the corresponding resource was shared by a member of the user's social affinity group are selected more frequently than search results including annotations indicating the corresponding resource was created by a member in the user's social affinity group then shared associations are prioritized over created associations.

In some implementations, the annotator 412 annotates search results based on relative measures. For example, when multiple search results could be annotated using an aggregate count of members of a social affinity group who approve of a corresponding resource, the annotator 412 can compare the aggregate counts to determine statistical outliers. Statistical outliers can be search results with corresponding aggregate counts of two or more standard deviations above the average aggregate count. The search results that correspond to the statistical outliers are annotated while the rest of the search results are not.

In some implementations, the annotator 412 annotates a limited number of search results 410. For example, the annotator 412 can annotate the first two, four, or six search results 410 that are of social interest to the user. In some implementations, search results of social interest to the user that were not selected for annotation (e.g. after the first two, four, or six annotated search results) are deleted from the search results.

The annotated search results 420 are sent from the server 404 to the client device 400 for presentation to the user.

Figure 5:
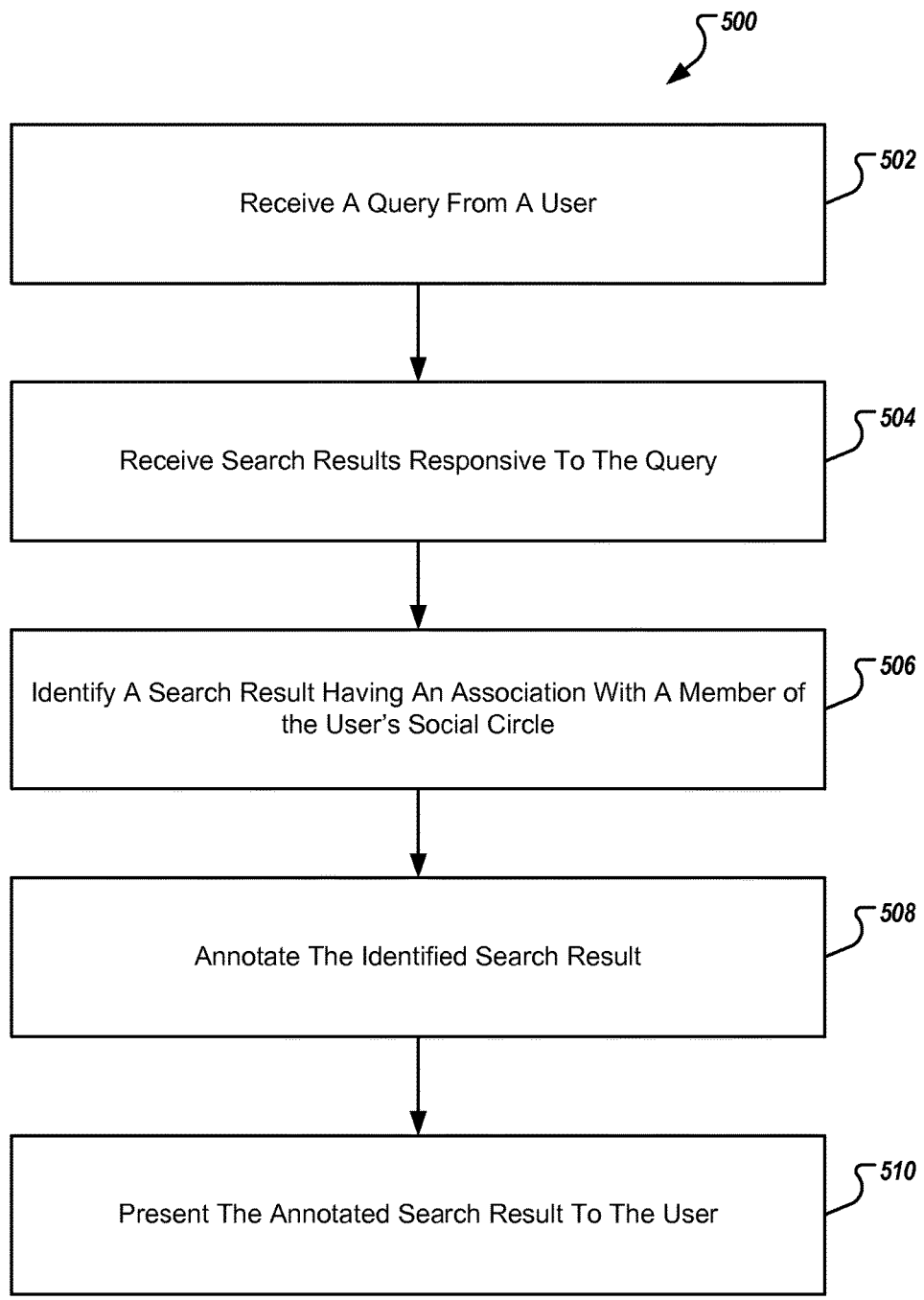
FIG. 5 illustrates an example process for annotating search results.

FIG. 5 illustrates an example process 500 for annotating search results. The process 500 can be implemented in the server 404.

The process receives a query from a user (502). The query can be received as part of a network transmission, for example, an HTTP request message.

The process receives search results responsive to the query (504). The search engine can produce search results corresponding to resources responsive to the query, and the search results are received from the search engine.

The process identifies a search result having an association with a member of the user's social affinity group (506). The search result is associated with the member of the user's social affinity group because of an association between the member and a resource corresponding to the search result. For example, the member can have created the resource, the member can have shared the resource with another, or the member can have provided a recommendation of the resource.

The process annotates the identified search result (508). The annotation includes information describing the relationship between the user and the member and information describing the association between the member and the search result. Annotations can be created as discussed above.

The process presents the annotated search results to a user (510). The search results can be presented to the user, for example, as a Hyper-Text Markup Language page sent as part of an HTTP response.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what can be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A method performed by a data processing apparatus, the method comprising:
   receiving a search query from a user, the user having a plurality of social affinity groups, each social affinity group identifying a group of users and the user as a proper subset of users of a network;
   receiving search results responsive to the search query, each search result referencing a corresponding resource that is determined to be responsive to the search query;
   identifying search results referencing resources that each have an association with one or more of the social affinity groups, where each association corresponds to one of a plurality of association types, each of the plurality of association types specifying one of a plurality of user actions performed by one or more different users of the one or more social affinity groups, the user actions including a user creation of an associated resource and a user endorsement of an associated resource;
   selecting one of the identified search results for annotation, wherein the selection is based in part on a predetermined priority hierarchy of association types that specifies a different priority for each user action specified by an association type, and the selected search result has an association that corresponds to an association type with a highest priority among association types of the associations of the identified search results;
   annotating the selected search result, the annotation describing the association of one of the social affinity groups with the resource the selected search result references, and further identifying the social affinity group, the annotation comprising:
      determining a number of users that are members of the one of the social affinity groups;
      for each of a plurality of annotation terms, wherein each annotation term describes a relative threshold of a number of users that are members of the one of the social affinity groups, determining a target threshold for the annotation term, and wherein the target threshold for each annotation term is different from the target threshold for each other annotation term;
      determining, for each annotation term of the plurality of annotation terms, a threshold value based, at least in part, on the number of users that are members of the one of the social affinity groups and the target threshold for the annotation term;
      comparing the number of users that are members of the one of the social affinity groups to the threshold values; and
      applying, as the annotation, the annotation term having a target threshold that is i) less than the number of users that are members of the one of the social affinity groups and ii) that is greater than each other target threshold this is less than the number of users that are members of the one of the social affinity groups;
   presenting the annotated search result to the user.

2. The method of claim 1, wherein the plurality of user actions include a user sharing the resource with another user.

3. The method of claim 1, wherein the social affinity groups include:
   a list of members identified by the user in a social networking service;
   a member and the user belong to a group;
   a member and the user share a geographical area; and
   a member and the user each have a relationship with a second user.

4. The method of claim 1, wherein annotating the selected search result comprises:
   determining a count of members of the social affinity group having a same association with the identified search result; and
   annotating the selected search result based on the count.

5. The method of claim 1, further comprising:
   determining not to annotate a second search result having an association with a second member of the social affinity group in response to a number of previously annotated search results not exceeding a threshold.

6. The method of claim 1, further comprising:
   identifying a second search result associated with previous search activity of the user; and annotating the second search result based on the association with the previous search activity.

7. The method of claim 1 wherein the annotated search result comprises a hyperlink to a user profile of a member of the social affinity group.

8. The method of claim 1 wherein the annotated search result comprises a hyperlink to member generated content associated with the resource.

9. The method of claim 1, wherein the plurality of association types includes two or more of:
   a creation type that indicates a resource was created by a corresponding social affinity group;
   an endorsement type that indicates a resource was endorsed by a corresponding social affinity group;
   a share type that indicates a resource was shared by a corresponding social affinity group;
   a tag type that indicates a resource was tagged by a corresponding social affinity group; or
   a comment type that indicates a resource was commented on by a corresponding social affinity group.

10. A method performed by a data processing apparatus, the method comprising:
   receiving a search query from a user, the user having a plurality of social affinity groups, each social affinity group identifying a group of users and the user as a proper subset of users of a network;
   receiving search results responsive to the search query, each search result referencing a corresponding resource that is determined to be responsive to the search query;
   identifying a search result referencing a resource having an association with a plurality of users in a particular social affinity group of the plurality of social affinity groups;
   comparing a count of the plurality of users having the association to a plurality of thresholds, each of the plurality of thresholds corresponding to a numerical range of users and a relative term describing the threshold, wherein a number of users corresponding to each threshold is different from each other number of users corresponding to each other threshold, and wherein the relative term describing each threshold is different from each other relative term describing each other threshold;
   determining that the count of the plurality of users having the association is within a numerical range of a first threshold of the plurality of thresholds; and
   in response to determining that the count is within the first threshold, applying the relative term corresponding to the first threshold to the search result.

11. The method of claim 10, wherein the first threshold depends on a count of the plurality of users in the particular social affinity group.

12. A non-transitory computer storage medium encoded with a computer program, the program comprising instructions that when executed by data processing apparatus cause the data processing apparatus to perform operations comprising:
   receiving a search query from a user, the user having a plurality of social affinity groups, each social affinity group identifying a group of users and the user as a proper subset of users of a network;
   receiving search results responsive to the search query, each search result referencing a corresponding resource that is determined to be responsive to the search query;
   identifying search results referencing resources that each have an association with one or more of the social affinity groups, where each association corresponds to one of a plurality of association types, each of the plurality of association types specifying one of a plurality of user actions performed by one or more different users of the one or more social affinity groups, the user actions including a user creation of an associated resource and a user endorsement of an associated resource;
   selecting one of the identified search results for annotation, wherein the selection is based in part on a predetermined hierarchy of association types that specifies a different priority for each user action specified by an association type, and the selected search result has an association that corresponds to an association type with a highest priority among association types of the associations of the identified search results;
   annotating the selected search result, the annotation describing the association of one of the social affinity groups with the resource the selected search result references, and further identifying the social affinity group, the annotation comprising:
     determining a number of users that are members of the one of the social affinity groups;
     for each of a plurality of annotation terms, wherein each annotation term describes a relative threshold of a number of users that are members of the one of the social affinity groups, determining a target threshold for the annotation term, and wherein the target threshold for each annotation term is different from the target threshold for each other annotation term;
     determining, for each annotation term of the plurality of annotation terms, a threshold value based, at least in part, on the number of users that are members of the one of the social affinity groups and the target threshold for the annotation term;
     comparing the number of users that are members of the one of the social affinity groups to the threshold values; and
     applying, as the annotation, the annotation term having a target threshold that is i) less than the number of users that are members of the one of the social affinity groups and ii) that is greater than each other target threshold this is less than the number of users that are members of the one of the social affinity groups; and
   presenting the annotated search result to the user.

13. The computer storage medium of claim 12, wherein the plurality of association types includes two or more of:
   a creation type that indicates a resource was created by a corresponding social affinity group;
   an endorsement type that indicates a resource was endorsed by a corresponding social affinity group;
   a share type that indicates a resource was shared by a corresponding social affinity group;
   a tag type that indicates a resource was tagged by a corresponding social affinity group; or
   a comment type that indicates a resource was commented on by a corresponding social affinity group.

14. A system comprising:
   one or more computers; and
   a computer-readable storage device coupled to the one or more computers having instructions stored thereon which, when executed by the one or more computers, cause the one or more computers to perform operations comprising:
     receiving a search query from a user, the user having a plurality of social affinity groups, each social affinity group identifying a group of users and the user as a proper subset of users of a network;
receiving search results responsive to the search query, each search result referencing a corresponding resource that is determined to be responsive to the search query;
identifying search results referencing resources that each have an association with one or more of the social affinity groups, where each association corresponds to one of a plurality of association types, each of the plurality of association types specifying one of a plurality of user actions performed by one or more different users of the one or more social affinity groups, the user actions including a user creation of an associated resource and a user endorsement of an associated resource;
selecting one of the identified search results for annotation, wherein the selection is based in part on a predetermined hierarchy of association types that specifies a different priority for each user action specified by an association type, and the selected search result has an association that corresponds to an association type with a highest priority among association types of the associations of the identified search results;
annotating the selected search result, the annotation describing the association of one of the social affinity groups with the resource the selected search result references, and further identifying the social affinity group, the annotation comprising:
determining a number of users that are members of the one of the social affinity groups;
for each of a plurality of annotation terms, wherein each annotation term describes a relative threshold of a number of users that are members of the one of the social affinity groups, determining a target threshold for the annotation term, and wherein the target threshold for each annotation term is different from the target threshold for each other annotation term;
determining, for each annotation term of the plurality of annotation terms, a threshold value based, at least in part, on the number of users that are members of the one of the social affinity groups and the target threshold for the annotation term;
comparing the number of users that are members of the one of the social affinity groups to the threshold values; and
applying, as the annotation, the annotation term having a target threshold that is i) less than the number of users that are members of the one of the social affinity groups and ii) that is greater than each other target threshold this is less than the number of users that are members of the one of the social affinity groups; and
presenting the annotated search result to the user.

15. The system of claim 14, wherein the plurality of association types includes two or more of:
a creation type that indicates a resource was created by a corresponding social affinity group;
an endorsement type that indicates a resource was endorsed by a corresponding social affinity group;
a share type that indicates a resource was shared by a corresponding social affinity group;
a tag type that indicates a resource was tagged by a corresponding social affinity group; or
a comment type that indicates a resource was commented on by a corresponding social affinity group.

16. A non-transitory computer storage medium encoded with a computer program, the program comprising instructions that when executed by data processing apparatus cause the data processing apparatus to perform operations comprising:
receiving a search query from a user, the user having a plurality of social affinity groups, each social affinity group identifying a group of users and the user as a proper subset of users of a network;
receiving search results responsive to the search query, each search result referencing a corresponding resource that is determined to be responsive to the search query;
identifying a search result referencing a resource having an association with a plurality of users in a particular social affinity group of the plurality of social affinity groups;
comparing a count of the plurality of users having the association to a plurality of thresholds, each of the plurality of thresholds corresponding to a numerical range of users and a relative term describing the threshold, wherein a number of users corresponding to each threshold is different from each other number of users corresponding to each other threshold, and wherein the relative term describing each threshold is different from each other relative term describing each other threshold;
determining that the count of the plurality of users having the association is within a numerical range of a first threshold of the plurality of thresholds; and
in response to determining that the count is within the first threshold, applying the relative term corresponding to the first threshold to the search result.

17. A system comprising:
one or more computers; and
a computer-readable storage device coupled to the one or more computers having instructions stored thereon which, when executed by the one or more computers, cause the one or more computers to perform operations comprising:
receiving a search query from a user, the user having a plurality of social affinity groups, each social affinity group identifying a group of users and the user as a proper subset of users of a network;
receiving search results responsive to the search query, each search result referencing a corresponding resource that is determined to be responsive to the search query;
identifying a search result referencing a resource having an association with a plurality of users in a particular social affinity group of the plurality of social affinity groups;
comparing a count of the plurality of users having the association to a plurality of thresholds, each of the plurality of thresholds corresponding to a numerical range of users and a relative term describing the threshold, wherein a number of users corresponding to each threshold is different from each other number of users corresponding to each other threshold, and wherein the relative term describing each threshold is different from each other relative term describing each other threshold;
determining that the count of the plurality of users having the association is within a numerical range of a first threshold of the plurality of thresholds; and in response to determining that the count is within the first threshold, applying the relative term corresponding to the first threshold to the search result.

* * * * *